(12) United States Patent  
Conrado et al.

(10) Patent No.: US 7,978,859 B2  
(45) Date of Patent: Jul. 12, 2011

(54) PRIVATE AND CONTROLLED OWNERSHIP SHARING

(75) Inventors: Claudine Viegas Conrado, Eindhoven (NL); Geert Jan Schrijen, Eindhoven (NL); Milan Petkovic, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1021 days.

(21) Appl. No.: 11/814,575

(22) PCT Filed: Jan. 19, 2006

(86) PCT No.: PCT/IB2006/050206  
§ 371 (c)(1),  
(2), (4) Date: Jul. 24, 2007

(87) PCT Pub. No.: WO2006/077551  
PCT Pub. Date: Jul. 27, 2006

(65) Prior Publication Data  
US 2008/0152146 A1 Jun. 26, 2008

(30) Foreign Application Priority Data  
Jan. 24, 2005 (EP) .................................... 05100429

(51) Int. Cl.  
*G06F 21/00* (2006.01)  
*G06F 7/04* (2006.01)  
(52) U.S. Cl. ............................ 380/278; 726/26; 705/74  
(58) Field of Classification Search .................... 726/30; 705/74  
See application file for complete search history.

(56) References Cited

U.S. PATENT DOCUMENTS

| 5,917,912 | A | 6/1999 | Ginter et al. |
| 2004/0143745 | A1* | 7/2004 | Margolus et al. ............. 713/176 |
| 2006/0021065 | A1* | 1/2006 | Kamperman et al. .......... 726/28 |
| 2006/0129847 | A1* | 6/2006 | Pitsos ........................... 713/193 |

FOREIGN PATENT DOCUMENTS

| WO | 9842098 | 9/1998 |
| WO | 02065782 A1 | 8/2002 |

OTHER PUBLICATIONS

Marc A Kaplan; "IBM Cryptolopes, Superdistribution and Digital Rights Management", IBM Research, 1996, XP002132994.

* cited by examiner

*Primary Examiner* — Matthew B Smithers

(57) ABSTRACT

The present invention relates to a method, a device and a system for preventing unauthorized introduction of content items in a network containing compliant devices and enabling users in the network to be anonymous. A basic idea of the present invention is to provide a CA (206) with a fingerprint of a content item to be introduced in a network at which the CA is arranged. Further, the CA is provided with an identifier of a content introducer (201), which introduces the particular content item in the network. The CA compares the fingerprint to a predetermined set of fingerprints, and content item introduction is allowed if the content item fingerprint cannot be found among the fingerprints comprised in the set. On introduction of the content item, the CA generates a pseudonym for the content introducer and creates a signed content ID certificate comprising at least said fingerprint and a unique content identifier for the content item and the pseudonym of the content introducer.

22 Claims, 4 Drawing Sheets

PRIVATE AND CONTROLLED OWNERSHIP SHARING

The present invention relates to a method, a device and a system for preventing unauthorized introduction of content items in a network containing compliant devices and enabling users in the network to be anonymous.

In prior art DRM systems, content rights are associated with content items, such as audio files, movies, electronic books etc. Content rights typically contains rules (e.g. play, copy, distribute etc.) and necessary cryptographic keys for encrypting/decrypting the content item(s) with which they are associated. Content rights should only be transferred to devices that are compliant and operated by users that have appropriate user rights, i.e. rights specifying who can use the content rights. Note that a content right and a user right may be merged in one single license, as is known from Open Mobile Alliance (OMA) DRM. Compliant devices comply with a given standard and adhere to certain operation rules. They also communicate by means of a certain protocol such that they answer questions and requests, which are posed to them, in the expected way. Compliant devices are considered to be trusted, which e.g. means that they will not illegally output content on a digital interface and that ownership of a device is not important. Device compliancy management, i.e. compliant device identification, renewability of devices, and revocation of devices, can be effected by using known techniques.

In general, content providers do not want to authorize users to create their own content rights, due to the risk of uncontrollable distribution of commercial content items. Consequently, the content provider digitally signs the content rights before they are distributed. Further, it must be enforced that the compliant devices check the signatures of the content rights and refuse content rights which are not properly signed by the content provider. Typically, the devices are comprised in a network or domain.

The above described approach is suitable for DRM systems in which only content provider(s) distribute content rights. However, if users wish to introduce personal content items, such as e.g. photos or home videos, they have to involve the content provider to create content rights for the personal content items. This is undesired, since the content provider should not be able to control personal content. In DRM systems in which commercial content items as well as personal content items are distributed, a compliant device may be authorized to create a content right for a specific personal content item. This content right may be signed by the compliant device, and if it is not signed, any compliant device shall reject the content right. This has the effect that personal content only can enter the network of devices via a compliant device. In environments with stricter security requirements, the content rights may be signed by a trusted third party authority, i.e. a party which is trusted by concerned communicating parties.

A problem to be solved in prior art DRM systems, in which commercial content items as well as personal content items are introduced, is that they are susceptible to attacks involving substitution of content item identifiers. A content item identifier uniquely identifies a corresponding content item in the system.

In DRM systems in which commercial content items as well as personal content items are distributed, any user is authorized to create a content right for a specific personal content item, which content right may be signed by a compliant device as mentioned above or by the user himself, and hence the user effectively becomes a content provider in his own right. Any user may also acquire commercial content items from a content provider and introduce them in the system. A malicious user may substitute a specific personal content item for a commercial content item following the creation of the content right associated with the specific personal content item. This will involve hacking of the compliant device to obtain a key to decrypt the commercial content item, such that the commercial content item comes in the clear. The malicious user then has to re-encrypt the commercial content, which has been obtained in an unauthorized manner, with a content key that is present in the content right that is associated with the specific personal content. Thereafter, the re-encrypted commercial content item is associated with the content identifier of the specific personal content item. The malicious user may then use this commercial content item with the same rights as his own personal content item. As a highly undesired consequence, a great number of commercial content items may be introduced and distributed in the network, if it is encrypted with the leaked content key.

Hence, to avoid this attack, a secure link between a content item and a corresponding content item identifier is required. This has been solved by employing fingerprints of content. These fingerprints are used to uniquely identify the content to which they refer. A fingerprint of a content item is a representation of the information signal in question, which does not change when the content item is modified slightly. Such fingerprints are sometimes also known as "(robust) hashes". The term robust hashes refers to a hash function which, to a certain extent, is robust with respect to data processing and signal degradation, e.g. due to compression/decompression, coding, AD/DA conversion, etc. Robust hashes are sometimes also referred to as robust summaries, robust signatures, or perceptual hashes.

A known method of generating fingerprints is described in detail in WO 02/065782, which belongs to the applicant of the present patent application. However, a skilled person realizes that many other methods of generating fingerprints exist. The compliant device adds fingerprint information to the content right before signing it. When a content right is used, the compliant device must check whether the fingerprint information that is included in the content right also can be found in the actual content item. If the fingerprint information cannot be found in the actual content item, the content right must be rejected.

However, a problem that remains in the approach of employing fingerprints is that it does not prevent a user from unauthorized introduction and distribution of commercial content in the network. As can be seen from the above, in DRM systems in which commercial content items as well as personal content items are introduced and distributed, any user can create content rights for any content item.

Moreover, in the types of DRM system described above, there is no possibility for a user to be anonymous to other parties with which communication takes place. It may be a privacy requirement of a user that he/she cannot be linked to a given content item towards the other parties, not taking into account a possible trusted third party authority via which content items are introduced in the network and various rights are signed, which authority must be able to identify parties with which it communicates.

An object of the present invention is to solve the above given problems and to provide a solution for preventing unauthorized introduction of commercial content while enabling users in the network to be anonymous.

This object is attained by a method of preventing unauthorized distribution introduction of content items in a network containing compliant devices and enabling users in the network to be anonymous in accordance with claim 1, a device for preventing unauthorized introduction of content items in a network containing compliant devices and enabling users in the network to be anonymous in accordance with claim 17, a system for preventing unauthorized introduction of content items in a network containing compliant devices and enabling users in the network to be anonymous in accordance with claim 20 and a certificate used for preventing unauthorized introduction of content items in a network containing compliant devices and enabling users in the network to be anonymous in accordance with claim 22.

According to a first aspect of the present invention, there is provided a method comprising the steps of providing a fingerprint of a content item to be introduced in the network and an identifier of a content introducer introducing said content item in the network, comparing said fingerprint to a predetermined set of fingerprints, wherein introduction of the content item is allowed if said fingerprint cannot be found in said set of fingerprints. Moreover, the method comprises the steps of generating a pseudonym for the content introducer and generating a signed content identifier certificate comprising at least said fingerprint and a unique content identifier for the content item and the pseudonym of the content introducer.

According to a second aspect of the present invention, there is provided a device comprising means for receiving a fingerprint of a content item to be introduced in the network and an identifier of a content introducer introducing said content item in the network, means for comparing said fingerprint to a predetermined set of fingerprints, wherein introduction of the content item is allowed if said fingerprint cannot be found in said set of fingerprints. Moreover, the device comprises means for generating a pseudonym for the content introducer and means for generating a signed content identifier certificate comprising at least said fingerprint and a unique content identifier for the content item and the pseudonym of the content introducer.

According to a third aspect of the present invention, there is provided a system comprising at least one compliant device and a certificate authority. The compliant device is arranged with means for determining a fingerprint of a content item to be introduced in the network and an identifier of a content introducer introducing said content item in the network, and means for sending the fingerprint and the identifier to the certificate authority. The certificate authority is arranged with means for comparing said fingerprint to a predetermined set of fingerprints, wherein introduction of the content item is allowed if said fingerprint cannot be found in said set of fingerprints. Moreover, the certificate authority is arranged with means for generating a pseudonym for the content introducer and means for generating a signed content identifier certificate comprising at least said fingerprint and a unique content identifier for the content item and the pseudonym of the content introducer and further with means for distributing the signed content identifier certificate to the compliant device.

According to a fourth aspect of the present invention, there is provided a certificate comprising at least a fingerprint of a content item to be introduced in the network, a unique content identifier for the content item, a pseudonym of a content introducer introducing said content item in the network and a signature of an authorized certificate authority.

A basic idea of the present invention is to provide an authorized certificate authority (CA) with a fingerprint of a content item to be introduced in a network in or on behalf of which the CA is arranged. Further, the CA is provided with an identifier of a content introducer, which introduces the particular content item in the network. The content introducer may comprise a user, i.e. an individual, but it may also comprise a content provider in more traditional sense, e.g. Warner Brothers. The CA compares the fingerprint to a predetermined set of fingerprints, and introduction of the content item in the network is allowed if the fingerprint of the content item cannot be found among the fingerprints comprised in the set.

On condition that the content item may be introduced in the network, the CA generates a pseudonym for the content introducer. The CA further generates a signed content identifier (ID) certificate. The content ID certificate comprises at least said fingerprint and a unique content identifier for the content item. Moreover, it comprises the pseudonym of the content introducer.

The pseudonym may for example be computed by generating a random number for the content introducer at the CA and computing the pseudonym for the content introducer based on the generated random number and the identifier, in a manner such that the random value and identifier cannot easily be guessed or calculated by analyzing the pseudonym. However, there are many other possible ways of computing pseudonyms.

In prior art DRM systems, in which commercial content items as well as personal content items are introduced and distributed, any user is authorized to create a content right for a specific personal content item and hence effectively becomes a content provider in his own right. Since compliant devices do not have access to information regarding ownership of a content item, any user can create content rights for any content item. According to the present invention, the signed content identifier (ID) certificate comprising the fingerprint and the unique content identifier for the particular content item with which it is associated is introduced in the network of compliant devices. Note that the CA may be a trusted third party, or alternatively a trusted compliant device to which the authority to sign certificates has been distributed by the trusted third party. Further, it should be realized that even though the fingerprint of the content item as well as the unique content identifier for the content item both are unique, the fingerprint is actually calculated from the content item, whereas the unique content identifier typically is selected by the CA and assigned to the content item. The unique content identifier is linked to the fingerprint by the content ID certificate, which makes it a valid content identifier. The unique content identifier may e.g. be a numeral, or a string of characters representing the title and/or the artist associated with the particular content item.

The signing of the content ID certificate is effected in order to prevent malicious users from tampering with it. Whenever a user wants to use a content right to access a corresponding content item, the compliant device on which the content item is to be rendered verifies correctness of the signature of the content ID certificate and compares the fingerprint of the content item with the fingerprint that is comprised in the content ID certificate. In the prior art, the content right can be used to access the content item if there is a match. As previously mentioned, content ID substitution attacks may be prevented by creating a secure link between a content item and a unique content item identifier. However, this does not hinder unauthorized introduction and distribution of content items in the network. If a malicious user has obtained cryptographically protected, i.e. encrypted, commercial content via the DRM system, he may hack the compliant device which handles the content, in order to procure a secret decryption key to create a clear text copy of the commercial content. Hence, the malicious user can create a new content right for the commercial content. To overcome this problem, the present invention links a user (i.e. a content provider) and a content item.

This is accomplished by including, in the content ID certificate, the pseudonym of the user/content provider who introduced the content item in the network. The user/content provider who introduced the content item in the network is occasionally referred to herein as a "content introducer". When a user is to create a content right for a particular content item, the compliant device which is employed will check that the user's pseudonym is present in the content ID certificate signed by the CA. If the user's pseudonym is present in the content ID certificate, the user is deemed authorized to create content rights for the particular content item. This is a result of the fact that if the user's pseudonym is included in the signed certificate, it must have been this particular user that introduced the content item in the network, which introduction has been authorized by the CA. On the contrary, if the content ID certificate does not comprise the user's pseudonym, the user is not authorized to create content rights for the particular content item. Hence, unauthorized introduction and distribution of content in the network is prevented.

Privacy requirements, as were mentioned in the above, may be fulfilled if a content introducer is able to register her content items under a pseudonym in a registration phase as has been described in the above. Further, for each content item, the content introducer can employ a different pseudonym.

In an embodiment of the present invention, the content introducer communicates directly with the CA, wherein the step of providing the fingerprint of a content item to be introduced in the network and the identifier of the content introducer includes determining, from the content item, the fingerprint of the content item, as well as the identifier of said content introducer, at the CA.

In another embodiment of the present invention, the content introducer communicates with the CA via his/her compliant device, wherein the step of providing the fingerprint of a content item to be introduced in the network and the identifier of the content introducer is effectuated in two steps. First, the compliant device via which the content introducer introduces said content item in the network determines the fingerprint from the content item, as well as the identifier of the content introducer. The identifier is typically provided to the compliant device by means of inserting a smart card into the device, which smart card contains the content introducer's identifier, e.g. a public key (although other types of identifiers are possible). Alternatively, the compliant device is arranged with a key pad, via which the content introducers enters his/her identifier in the form of a personal code or string of characters. Then, the fingerprint of the content item and the identifier of the content introducer are sent to the CA for further processing.

In the case where the content introducer acts towards the CA via a compliant device, it is necessary that the CA distributes the signed content identifier certificate to the compliant device via which the content introducer introduces said content item. If a random number is employed to compute the pseudonym, as suggested hereinabove, a cryptographically protected copy of the random number must further be supplied to the compliant device. The cryptographic protection of the random number may be accomplished by encrypting the random number with the public key of the content introducer.

In prior art DRM systems, digital watermarks associated with authorized content providers are employed to enhance security. A watermark is applied by an authorized content provider to a particular content item, and a compliant device should check that there is no watermark present in the content item for which a user wishes to create a content right. Watermarked content is originally coming from an "official" (i.e. authorized) and commercial content provider and therefore users are not allowed to create their own content rights for such content. In case the content item is watermarked, a compliant device will only access the content if it has the appropriate content rights signed by the official content provider (of which the public key is known). If no watermark is detected, the content is classified as 'personal content' and the accompanying content rights may be signed by any compliant device. If a user makes an unauthorized attempt to introduce watermarked content, the compliant device will not allow it to be introduced. Further, the use of watermarks for identifying commercial content items makes DRM systems vulnerable to watermark attacks. Since digital watermarks must be detected by the compliant devices to identify commercial content items, the security of the system relies on the secrecy of a watermark detection key. If this key is leaked, the security is breached. Moreover, by using watermarking, older content items to which watermarks are not applied are not recognized by the system as commercial content, and can still be illegally distributed. Hence, there are problems in terms of backwards compatibility. Also, in prior art systems employing watermarking for identification of commercial content, personal content items are not watermarked and are therefore untraceable when obtained in clear text and outside the protected area of the DRM system.

According to the present invention, each personal content item introduced in the network must be registered in accordance with the previously discussed registration phase. During the registration phase, which has been described hereinabove, a fingerprint for the content item to be introduced is provided to the CA, in order to identify the content item as a possible commercial content item. Hence, in the present invention, watermarking is not employed for identification.

In an embodiment of the present invention, the CA further generates a watermark identifier and a watermarking key. Then, the watermark identifier is inserted in the content item by means of the watermarking key. The watermark identifier employed in this embodiment enables tracing of the content introducer, i.e. the user/content provider that originally introduced the content item, in case a personal content item is misused. Further, in case a malicious user tampers with the fingerprint of a content item and introduces a commercial content item as a personal content item, the watermark facilitates identification of the unauthorized distributor (i.e. the malicious user).

In the case where the content introducer acts towards the CA via a compliant device, it is necessary that the CA distributes the watermark identifier and the watermarking key, to the compliant device via which the content introducer introduces said content item, such that the compliant device may insert the watermark identifier in the content item.

According to yet another embodiment of the present invention, the CA stores a data post comprising the watermark identifier, the identifier of the content introducer, the fingerprint of the content item and the random number. It is also possible that the unique content identifier is included in the data post, if there is a desire to keep track of the content identifier as well. Hence, the watermark identifier inserted in the content item will act as a pointer to this data post stored at the CA.

As previously mentioned, the watermark identifier enables tracing of the content introducer, i.e. the user/content provider which originally introduced the content item, in case a personal content item is misused. From the point of view of the CA, the watermark identifier is a pointer to a data post for each introduced content item in a database. The watermark identifier may be retrieved from the database, which is stored in an appropriate storage medium at the CA, by using the fingerprint of the content item. Subsequently, the content introducer may be found in the database. Further, as described hereinabove, in case a malicious user tampers with the fingerprint of a content item (or if the fingerprint cannot be found in the database, which means that the CA never has authorized the introduction of the content item) and introduces a commercial content item as a personal content item, the watermark facilitates identification of the unauthorized distributor (i.e. the malicious user). Moreover, the CA can use the stored fingerprint of the personal content item to protect that personal content item from being illegally reintroduced in the network. Due to restrictions in the amount of data that the CA can process, the CA may allow fingerprint identification for commercial content items only, allowing an option for identification of personal content items (and therefore extra protection for the personal content items). Possibly, users may have to pay an additional security fee for that feature.

According to an alternative embodiment of the invention, instead of inserting the watermark identifier into the content item, a data structure comprising the fingerprint and the pseudonym of the content introducer (and possibly the unique content identifier) is inserted into the content item by means of the watermarking key.

According to still another embodiment of the present invention, the CA is, when the identifier of the content introducer is provided, also provided with identifiers of all users which are to be registered as owners of the content item. With the provision of these identifiers, the users who are to be registered as owners of the content item are given content introducer status by the content introducer. On condition that the content item may be introduced in the network, the CA creates pseudonyms for each of the users, for example by generating random numbers, one for each and every one of the users which are to be registered as owners of the content item (hereinafter referred to as "registered content item owners"). Then, the CA computes a pseudonym for every one of the registered content item owners based on the generated random numbers and the identifiers of the respective registered content item owners, in a manner such that a particular random value and identifier cannot easily be guessed or calculated by analyzing the pseudonym. The pseudonyms of the registered content item owners are added to the content ID certificate before it is signed. Thereafter, the signed content identifier certificate, which now includes the pseudonyms of the registered content item owners, is distributed to a compliant device of the respective owner. If traceability and identification of malicious users are required, the watermark identifier and the watermarking key is also distributed. Further, each random number is encrypted with the public key of the corresponding owner and sent, via a compliant device, to the registered content item owner for which it was generated.

Consequently, in analogy with the basic idea of the invention, if a pseudonym of a particular user is included in the signed certificate, it must have been this particular user that introduced the content item in the network, or this particular user was given content introducer status by the content introducer, in that the pseudonym is included in the signed content ID certificate. Further, the watermark identifier employed in the present invention enables tracing of the content introducer as well as of the registered content item owners, in case a personal content item is misused.

A further, highly desirable advantage of this embodiment of the present invention is that a content introducer is able to share ownership of personal content with other users by including the pseudonyms of the other users in the content ID certificate. The wish to be able to share of content ownership arises quite often. For instance, a family vacation movie should in principle belong to all family members. The anonymity of these other users is also protected with this embodiment.

In another embodiment of the present invention, which is closely related to the previous embodiment, the identifiers of the users which are to be registered as owners of the content item, and the random number of each of the users, are added to the previously mentioned data post before it is stored at the CA.

Further features of, and advantages with, the present invention will become apparent when studying the appended claims and the following description. Those skilled in the art realize that different features of the present invention can be combined to create embodiments other than those described in the following.

A detailed description of preferred embodiments of the present invention will be given in the following with reference made to the accompanying drawings, in which.

Figure 1:
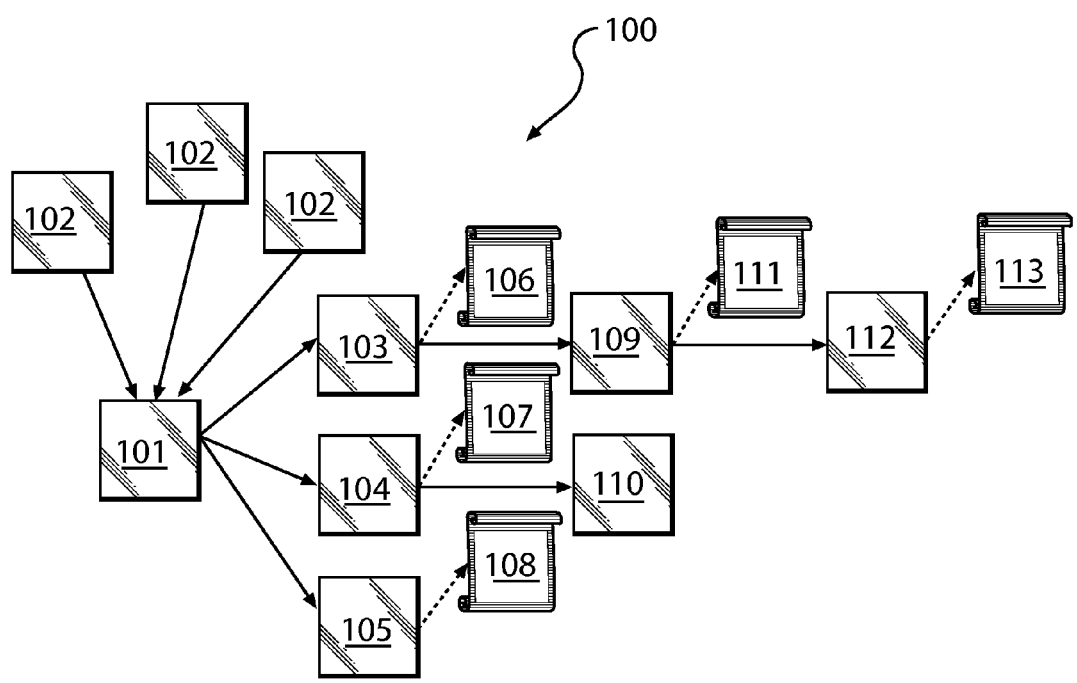
FIG. 1 shows an authorization hierarchy in which the present invention is applied.

FIG. 1 shows an authorization hierarchy 100 implementing the present invention. Continuous lines indicate authorization steps, which involve the use of public key certificates. These certificates are well known in the art and are hence not shown in FIG. 1. Dotted lines indicate issuing of certificates and/or rights.

A System Authority (SA) 101 is at the top of the hierarchy. All compliant devices has access to the public key of the SA. Typically, the SA public key is built-in into the hardware of each compliant device 102. With this public key, a compliant device can verify any certificate that has been issued by the SA 101. At the next level in the hierarchy, a Certificate Authority (CA) 103, a Device Authority (DA) 104 and a User ID Authority (UIDA) 105 are arranged. The CA 103 authorizes content providers 109 within the system. For example, EMI and Disney may constitute content providers within the network, but as previously mentioned, a compliant device or a user may also represent a content provider. In fact, in DRM systems in which commercial content items as well as personal content items are distributed, any user is authorized to create (via a compliant device) a content right for a specific personal content item and hence effectively becomes a content provider in his own right. Consequently, in a DRM system in which the present invention is applied, a large number of content providers exist, since the term "content provider" in this context includes both individual users and traditional content providers such as record and motion-picture companies and content distributors.

The CA 103 issues content ID certificates 106 and provides these to the content providers 109. The CA 103 may be a trusted third party or may alternatively be a compliant device. This is primarily a question of flexibility; if a compliant device is authorized to act as CA, it brings flexibility to the system. On the contrary, a third party provider may not want to "distribute" the right to issue content ID certificates to a compliant device for security reasons. The content ID certificate 106 has been described in detail hereinabove and comprises:

(a) the unique content ID and
(b) the fingerprint of a content item introduced in the network, as well as
(c) the pseudonym of a user having introduced the content item in the network (and possibly the pseudonyms of other users which are to be registered as owners of the content item) and
(d) a signature of the CA.

Note that it is possible that, in case the CA is a trusted third party, the content ID certificate is created at a content provider in the form of a compliant device, but signed at the CA.

A content provider 109 within the network is authorized to issue content rights 111 for a content item, if the content provider has been provided with a valid content ID certificate 106. Each content right contains the content ID and content key(s) that enable access to cryptographically protected content items with which the content right is associated (which association is made effective by means of the content ID in the content right, since it is compared to the content ID attached to the encrypted content item). The content right 111 also specifies a valid User Right Authority (URA) 112 for a particular content item, in that the content right 111 contains the public key of the URA 112. Hence, the content provider 109 may delegate issuance of user rights 113 to another party, namely the URA 112. This makes the system flexible, because it can support different usage models, including content distributed by a content provider, personal content (when a user/compliant device acts as content provider) and content imported from another DRM system. The content provider 109 who issues the content right 111 also signs it. In practice, the content provider itself is authorized to be URA, and hence issues the content rights 111 and the user rights 113. In fact, the content right and the user right for a particular content item may be combined into one single right.

The URA 112 issues a user right 113 for a certain content item. A user right indicates whether a user is allowed to use a content right to access a content item. The user right comprises a content ID, which is the link between the user right, the content right and the content item. As described hereinabove, these three components all comprise a content ID. The user right further comprises a rights expression that indicates how a user, which user is designated by means of a user ID in the form of a public key included in the user right, may use the content item. Finally, the user right is signed by the URA.

In terms of security aspects involved in handling different types of rights, there is a distinction between user rights 113 and content rights 111. User rights may be freely distributed, because they do not contain any secrets, and the signature prevents modifications. Content rights, on the other hand, contains cryptographic keys for accessing content items. Hence, content rights may only be transferred to compliant devices. Further, the transfer of content rights between devices requires secure communication means, which may be based on secure authenticated channels. Consequently, the content right 111 requires both confidentiality and integrity, whereas the user right 113 requires only integrity.

User and device management involves personalization and certification of users and devices, which are then introduced into the system and declared compliant (to certain required properties, as has previously been described). The Device Authority (DA) 104 is a trusted party that authorizes the Device ID Authorities (DIDA) 110 for several device manufacturers. Each device manufacturer (e.g. Philips, Sony) has its own DIDA 110 that gives devices a unique identity and an associated public key by means of a signed device ID certificate 107, hence indicating compliance.

The User ID Authority (UIDA) 105 is responsible for issuing user ID devices (not shown in FIG. 1). This is typically performed during a manufacturing phase. The UIDA 105 associates a user ID device, which device typically comprises e.g. a tamper resistant smart card or a SIM card, with a certain person by issuing a signed user ID certificate 108 containing the name, or any other identifier, of the user together with the public key of the user ID device. The private key that corresponds to this public key is considered to be the user's private key. However, the user is not given personal access to this private key. This prevents a user from distributing the private key to someone who thus could impersonate him. Therefore, the user's private key is securely stored on the user ID device, which is tamper resistant. The user ID device serves as a token, proving the user's presence. The user ID device should be easy to handle, robust, provide secure computing and hard to clone.

Each authority illustrated in FIG. 1 typically comprise one or more microprocessors or some other device with computing capabilities, e.g. an application specific integrated circuit (ASIC), a field programmable gate array (FPGA), a complex programmable logic device (CPLD), etc., in order the create the various certificates and rights. In the creation of the certificates and rights, as well as in intercommunication between the different authorities, the microprocessors execute appropriate software that is downloaded to the respective authority and stored in a suitable storage area, such as e.g. a RAM, a Flash memory or a hard disk. For intercommunication to be possible, the authorities are arranged with interfaces that enables the communication.

Before a certificate can be used, it has to be validated. Certificate validation implies that at least the integrity (using the signature) and the authenticity (using the chain of certificates that links a certificate to the certificate of the authority, all the way up to the SA) of a certificate is checked.

Figure 2:
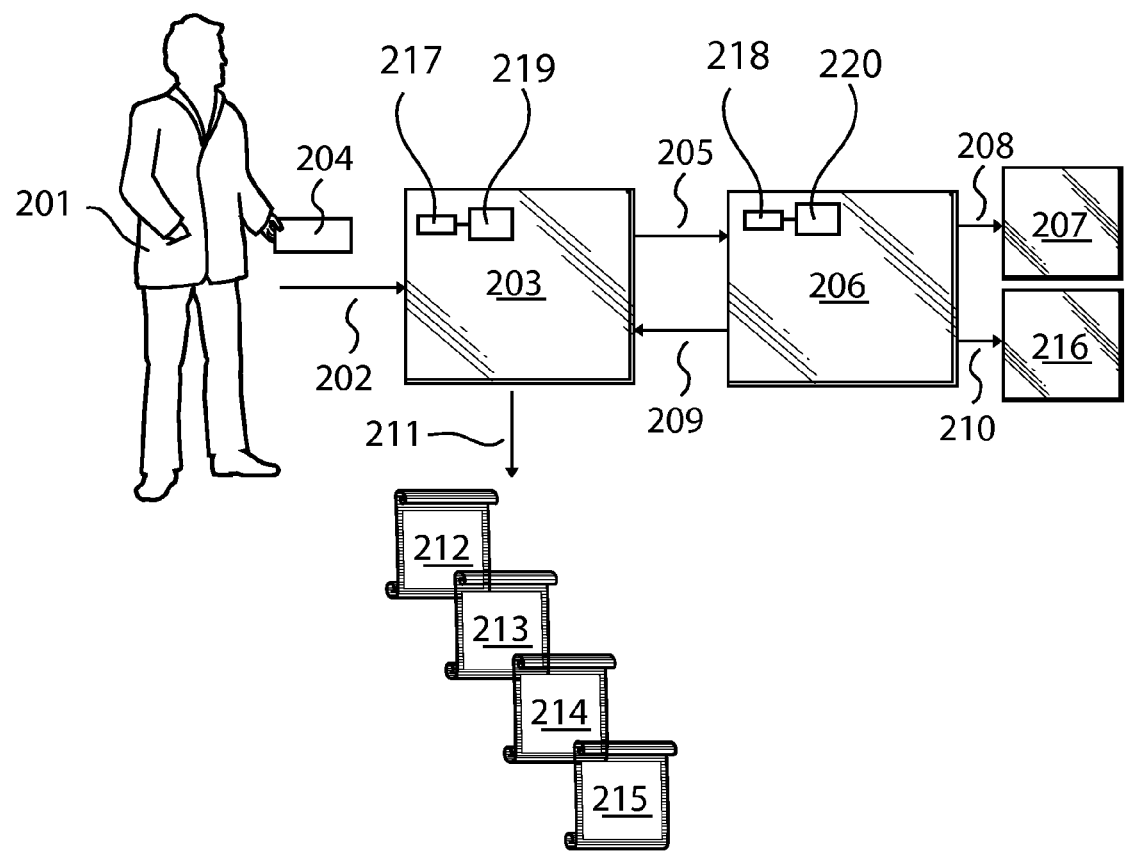
FIG. 2 shows a registration procedure used for content items to be introduced in the network, in accordance with an embodiment of the present invention.

With reference made to FIG. 2, which shows an embodiment of the present invention, when a new content item is to be registered in the network, a content introducer 201, in this case a user, presents (step 202) the content item to a compliant device 203. The compliant device determines the fingerprint of the content item. Moreover, by means of e.g. a smart card 204, the content introducer provides the compliant device with an identifier. The compliant device 203 forwards (step 205) the fingerprint of the content item and the identifier of the content introducer to a trusted certificate authority (CA) 206. Note that it is possible that the content introducer communicates directly with the CA, wherein step 202 is performed at the CA and step 205 is omitted. The unique content identifier is typically selected by the CA and comprises e.g. a string of characters defining artist and title, or a reference number. The compliant device 203 and the CA 206 each comprises a microprocessor 217, 218 in order to perform cryptographic operations and other computing operations. The microprocessors 217, 218 execute appropriate software that is downloaded to the compliant device 203 and the CA 206 and stored in a corresponding RAM 219, 220. The CA is equipped with a database stored in a storage medium 207, such as a RAM or a hard disk. The CA searches (step 208) for the fingerprint of the content item to be introduced in the database of fingerprints of existing commercial content or registered personal content. Introduction of the content item in the network is allowed if the fingerprint of the content Item cannot be found among any of the fingerprints stored in the storage medium 207.

If the content item may be introduced in the network, the CA 206 generates a random number a for the content introducer and computes a pseudonym h' for the content introducer, based on e.g. the following algorithm: $h'=h^a$; where h is the identifier, i.e. the public key, of the content introducer.

Further, the CA generates a signed content ID certificate comprising the fingerprint and the unique content identifier of the content item and the pseudonym h' of the content introducer. This signed content ID certificate is sent (step 209) to the compliant device 203 along with an encrypted copy of the random number a. The encryption is typically performed at the CA with the public key of the content introducer. The compliant device 203 can then create (step 211) other appropriate DRM certificates, e.g. a content right 212 and a user right 213, and the content item will be ready for sharing. The compliant device also uses the received content ID certificate 214 and a user ID certificate 215 (as described in connection to FIG. 1).

In a further embodiment of the present invention, the CA generates a watermark identifier and a watermarking key, in addition to the signed content ID certificate comprising the fingerprint and the unique content identifier of the content item and the pseudonym h' of the content introducer.

These data are sent (step 209) to the compliant device 203 along with the content ID certificate and the encrypted random number a. The compliant device then inserts the watermark identifier in the content item by means of the watermarking key. Alternatively, the watermarking is performed by the CA 206. After watermarking the content item, the compliant device 203 creates (step 211) other appropriate DRM certificates, e.g. a content right 212 and a user right 213, and the content item will be ready for sharing. The compliant device also uses the received content ID certificate 214 and a user ID certificate 215 (as described in connection to FIG. 1). The CA stores (step 210) a data post comprising the watermark identifier, the identifier of the content introducer and the fingerprint (and possibly the unique content identifier) of the content item, as well as the random number, in a storage medium 216. Note that the storage medias 207, 216 may be merged into one single storage medium, and may further be incorporated in the CA 206. The watermark identifier inserted into the content item typically serves as a pointer to an entry in the database of the CA where the data post is stored.

Figure 3:
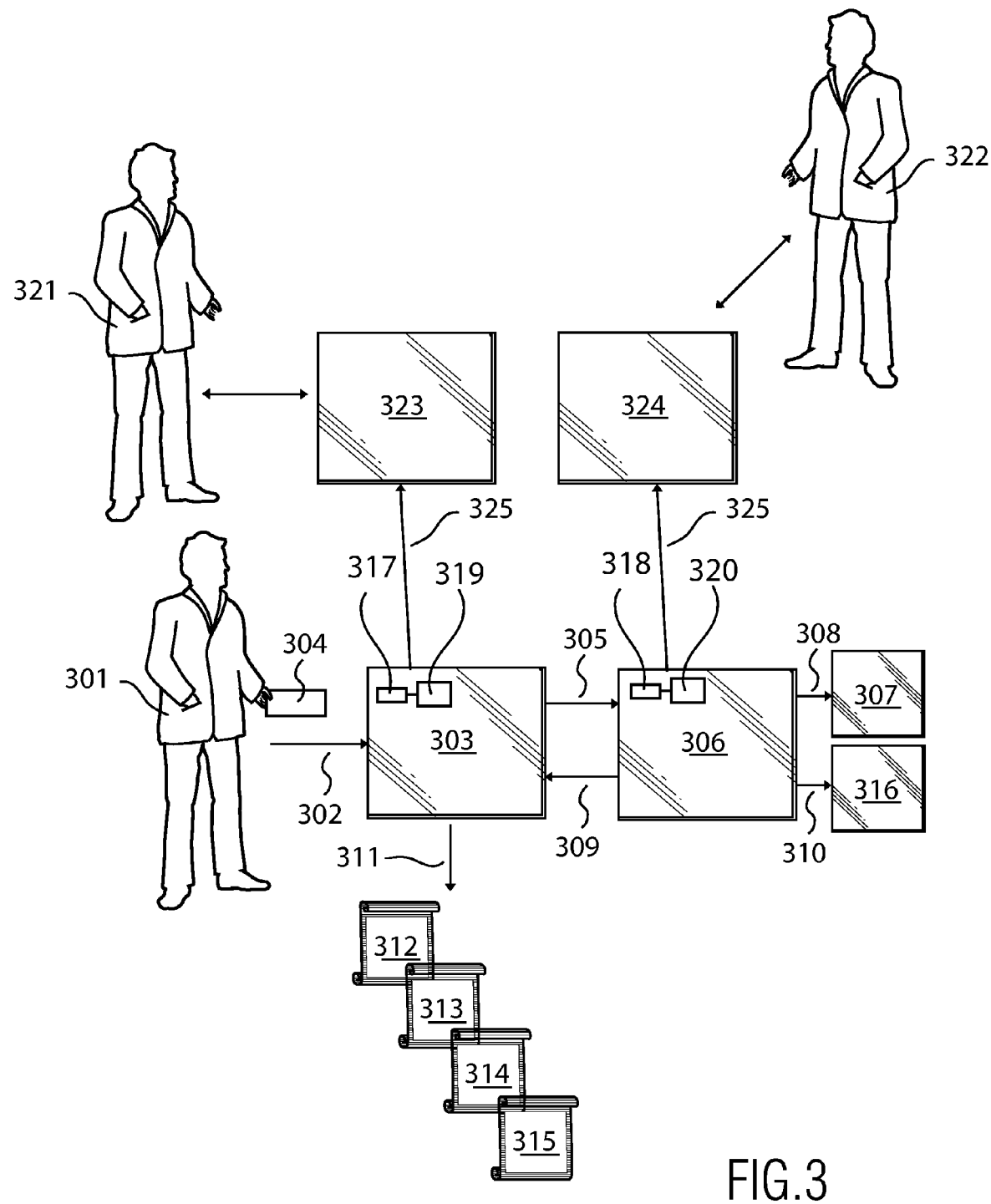
FIG. 3 shows a registration procedure used for content items to be introduced in the network, in accordance with another embodiment of the present invention.

With reference made to FIG. 3, which shows another embodiment of the present invention, when a new content item is to be registered in the network, a content introducer 301 presents (step 302) the content item to a compliant device 303. The compliant device determines the fingerprint of the content item. With a smart card 304, the content introducer provides the compliant device with an identifier in the form of a public key. The content introducer also provides identifiers, e.g. public keys, of users 321, 322 which are to be registered as owners of the content item. The compliant device 303 forwards (step 305) the fingerprint of the content item, the identifier of the content introducer and the identifiers of the users 321, 322, which are to be registered as owners of the content item, to a trusted certificate authority (CA) 306. The compliant device 303 and the CA 306 each comprises a microprocessor 317, 318 which executes appropriate software that is downloaded to the compliant device 303 and the CA 306 and stored in a corresponding RAM 319, 320. The compliant devices 323 and 324 are also equipped with microprocessors and memories, even though it is not illustrated in FIG. 3.

The CA searches (step 308) for the fingerprint of the content item to be introduced in a database of fingerprints of existing commercial content or registered personal content stored in a storage medium 307. Introduction of the content item in the network is allowed if the fingerprint of the content item cannot be found among any of the fingerprints stored in the storage medium 307.

If the content item may be introduced in the network, the CA 306 generates random numbers $a_i$ for the content introducer and each of the users which are to be registered as owners of the content item (hereinafter referred to as "registered content item owners"). The CA further computes a pseudonym $h_i'$ for the content introducer and each of the registered content item owners, based on e.g. the following algorithm: $h_i'=h_i^{a_i}$ where $h_i$ is the identifier, i.e. the public key, of the content introducer 301 or the registered content item owner 321, 322 for which the pseudonym is computed.

At least one pseudonym is computed for each and every one of the content introducer 301 and the registered content item owners 321, 322. As is realized by a skilled person, a number of mathematical algorithms may be used for computing the pseudonyms.

Further, the CA generates a watermark identifier, a watermarking key and a signed content ID certificate comprising the fingerprint and the unique content identifier of the content item and the pseudonyms $h_i'$ of the content introducer and the registered content item owners. The watermark identifier, the watermarking key and the signed content ID certificate are sent (step 309) to the compliant device 303. Moreover, the signed content ID certificate is sent (step 309) to a compliant device 323, 324 of the respective user 321, 322. This certificate ensures that the users become owners of the content item, which is associated with the unique content identifier, under the pseudonym which belongs to each user. Also, the random numbers $a_i$ are encrypted and sent (step 309) to the content introducer and the registered content item owners. Note that the respective encrypted random number only is sent to the content introducer or the registered content item owner for which the random number was generated. Hence, $a_1$ is sent to the compliant device 303 of the content introducer, $a_2$ is sent to the compliant device 323 of one of the registered content item owners 321 and $a_3$ is sent to the compliant device 324 of the other of the registered content item owners 322.

The compliant device 303 then inserts the watermark identifier in the content item by means of the watermarking key. Alternatively, the watermarking is performed by the CA 306. After watermarking the content item, the compliant device 303, as well as the compliant devices 323, 324, can create (step 311) other appropriate DRM certificates, e.g. a content right 312 and a user right 313, and the content item will be ready for sharing. The compliant device 303 and the compliant devices 323, 324 also use the received content ID certificate 314 and a user ID certificate 315 (as described in connection to FIG. 1). The CA stores (step 310) a data post comprising the watermark identifier, the identifier of the content introducer and the registered content item owners, the fingerprint (and possibly the unique content identifier) of the content item, as well as the random numbers, in a storage medium 316. With this data post in storage, the CA can calculate the pseudonyms of the users for the specific content item, which is identified by the fingerprint.

In the above procedure, it is assumed that a user has a private key x and a corresponding public key $h=g^x$, where g is a system parameter chosen in accordance with the cryptographic technique used. The public key of the user is registered with the CA, so this public key is linked to the user's identity. As described in the above, the CA generates a random number a and computes a pseudonym (i.e. a new public key) $h'=h^a$. There is also a new private key $x'=xa$ corresponding to the new public key h'. Every time a new pseudonym is needed, a new random number a, and a corresponding new pseudonym h', can be generated.

Because each owner knows her random number $a_i$, she can calculate her pseudonym $h_i'$ for the content ID and the corresponding private key, $x'_i=x_i a_i$. Since the CA stores the values $h_i$ and $a_i$ for all owners of a given content ID, the link between the owners and their pseudonyms as well as the content item can be used to trace any pseudonym and/or any content item back to any of the owners. This is referred to as "controlled anonymity" and is important in terms of accountability. In case malicious users manage to import, in an unauthorized manner, commercial (or other user's) content items to the DRM system under their pseudonyms, and this is eventually discovered by a party, this party can turn to the CA, since the CA stores data (i.e. the data post mentioned in the above) about the registration, show that the content was not new and ask for the pseudonym of the malicious users to be revoked. With its database of registered content items, owners and pseudonyms, the CA can find the original users' public keys and thus also their identities.

Further sharing of ownership beyond the group of initially defined owners should, preferably, be jointly decided by all owners. This requirement aims at limiting full-scale, and uncontrollable, distribution of personal content, which is very likely to include very private information regarding all or some of its owners, since ownership implies right to determine the rules for content usage, e.g. the right to determine who can distribute the content as User Right Authority, as well as access to decrypted content items.

Further sharing of ownership beyond the group of initially defined owners may occur if any of the owners gives her new private key x' (=xa) to an outsider, i.e. someone who has not been registered as an owner of the content item. Since a is kept secret, x' does not reveal the original private key x of the user, which original private key typically is valuable to the user (e.g., it may be used in other applications). Since the new key x' does not compromise the original key x, any owner may be "careless" and give her new private key x' to the outsider, who then is given the same rights to the particular content item as the owner. In an embodiment of the present invention, a mechanism is provided, which prevents the further sharing of ownership beyond the group of initially defined owners by giving away the new private key x'. To anyone who can prove knowledge of x' the CA will reveal the corresponding random number a (which is stored at the CA). Now, if this person is an outsider who received the new private key x' from the careless owner, this outsider can now calculate the original private key x of the careless owner as $x=x'/a$. This is not desirable from the point of view of the owner who has leaked her private key, so this mechanism actually deters her from sharing her new private key.

Figure 4:
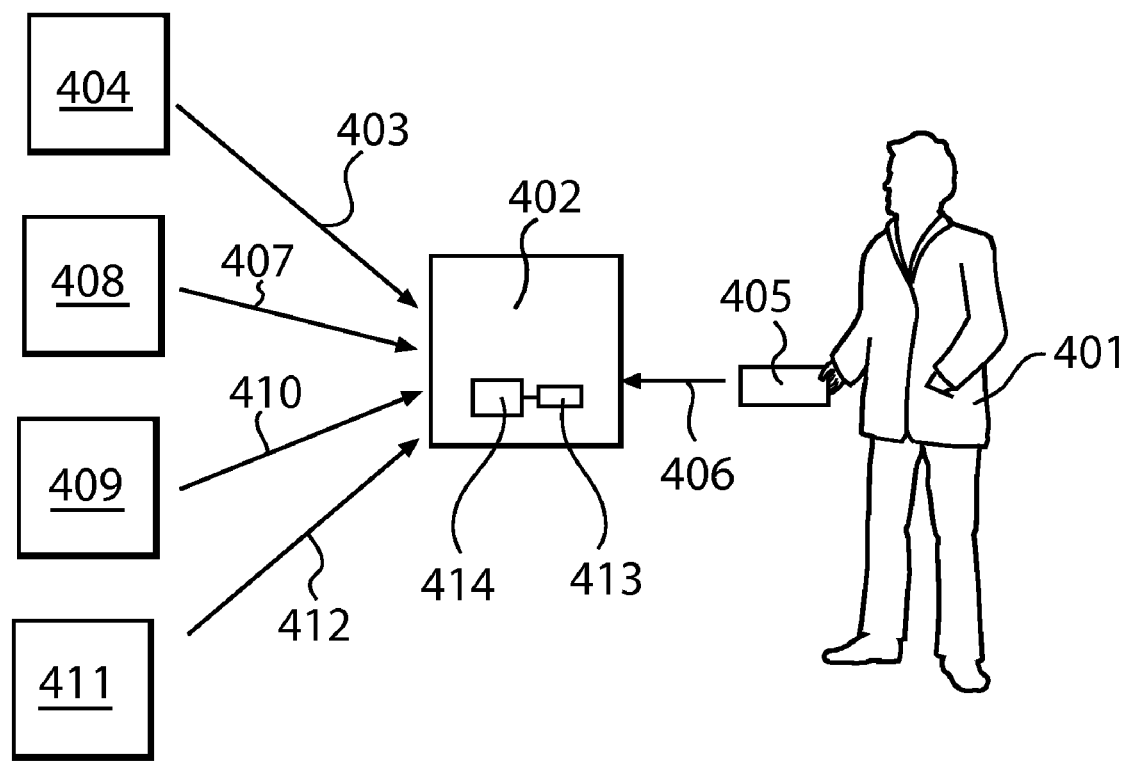
FIG. 4 shows an authentication procedure which is performed when a user wishes to access a content item, in accordance with an embodiment of the present invention.

Referring to FIG. 4, when a user 401, in the following referred to as Alice, wishes to access a content item, she will need the following:
(a) a content ID certificate,
(b) a content right,
(c) a user right, and
(d) a user ID certificate.

It is assumed that device compliancy has already been checked, which is why the above list does not comprise a device ID certificate. The content item has been loaded into a compliant device 402 in encrypted form. The compliant device may e.g. be a CD player, and the content item to be rendered on the device may be an audio CD. The compliant device 402 comprises a microprocessor 413 in order the create the various certificates and rights and to perform cryptographic operations and other computing operations described in the following. The microprocessor 413 executes appropriate software that is downloaded to the compliant device and stored in a RAM 414.

The compliant device 402 verifies (step 403) that the user ID certificate 404 is valid by checking the signature using the built-in public key in the compliant device. Alice 401 will also have to authenticate herself by proving she knows the secret key corresponding to the public key comprised in the user ID certificate. As previously mentioned, the user is not given personal access to this private key in order to prevent the user from distributing the private key, and thus prevent impersonation. Therefore, the user's private key is securely stored on a user ID device 405, e.g. a tamper resistant smart card, which is inserted (step 406) into, and read by, the compliant device 402. Further, the compliant device verifies (step 407) the signature of the user right 408, to ensure that the user right is valid. To do this, the compliant device checks the User Right Authority (URA) field in the content right 409 and verifies that the specified URA signed the user right. The compliant device 402 verifies that Alice 401 can use the user right 408. This is done by comparing the user ID, i.e. a user public key, in the user right with the user ID on Alice's user ID certificate 404.

The compliant device verifies (step 410) that the content provider was allowed to sign the content right. Thus, the device checks the signature of the content right 409 using the public key comprised in the content ID certificate 411. To do this, the compliant device must, by using its built-in public key, first verify (step 412) the content ID certificate by checking the signature of the content ID certificate provided by the CA (see FIG. 1). As described in the above, the content right 409 is created and signed by the actor who introduced the corresponding content item in the network. Hence, the public key comprised in the content ID certificate 411 is the public key of the user (i.e. content provider) having introduced the content item in the network, and this public key corresponds to the private key that was employed to sign the content right 409.

Finally, the compliant device 402 will have to verify if the content right can be used to access the encrypted content. To this end, the device computes a fingerprint of the content item and compares it with the fingerprint in the content ID certificate 411. If there is a match, Alice 401 is allowed to access the content item on the compliant device 402. If any of the above steps fail, Alice will not be given access to the content.

According to the present invention, a content ID certificate is introduced in the network of compliant devices. The signing of the certificate by the authorized certificate authority (CA) prevents malicious users from tampering with the content ID certificate. The fingerprint of the content item is included in the content ID certificate to hamper content ID substitution attacks. The problem related to unauthorized introduction and distribution of content items in the network by means of (unauthorized) creation of content rights is overcome by including, in the content ID certificate, the public key of the content introducer. When a user (or a third party content provider) is about to create a content right for a particular content item, the compliant device which is employed will check that the user's public key is present in the content ID certificate signed be the CA, as described hereinabove. If the user's public key is present in the content ID certificate, the user is deemed authorized to create content rights for the particular content item. Hence, unauthorized introduction and distribution of content in the network is prevented.

Further, anonymity for the content owner towards other parties in the DRM system is accomplished by allowing the content owner to register her content items under a pseudonym. Further, for each content item to be introduced in the network, the content introducer can employ a different pseudonym.

Even though the invention has been described with reference to specific exemplifying embodiments thereof, many different alterations, modifications and the like will become apparent for those skilled in the art. For example, the content ID certificate could also comprise the public key of a compliant device via which a content item is introduced. This public key may be used to create content rights in accordance with format of licenses used in OMA DRM. The content ID certificate could additionally or alternatively comprise information concerning type of certificate. This may be specified in a rights field, e.g. right=ownership. The described embodiments are therefore not intended to limit the scope of the invention, as defined by the appended claims.

The invention claimed is:

1. A method of preventing unauthorized introduction of content items in a network containing compliant devices and enabling users in the network to be anonymous, said method comprising the steps of:
   providing (i) a fingerprint of a content item to be introduced in the network and (ii) an identifier of a content introducer introducing said content item in the network;
   comparing said fingerprint to a predetermined set of fingerprints stored in a database of a certificate authority, wherein introduction of the content item is allowed if said fingerprint cannot be found in said set of fingerprints;
   generating a pseudonym for the content introducer, wherein the pseudonym provides anonymity for the content introducer in the network; and
   generating a signed content identifier certificate that comprises at least said (i) fingerprint, (ii) a unique content identifier for the content item and (iii) the pseudonym of the content introducer.

2. The method according to claim 1, further comprising the step of generating a random number for the content introducer and computing the pseudonym for the content introducer based on (i) the generated random number and (ii) the identifier of the content introducer.

3. The method according to claim 1, wherein the step of providing a fingerprint comprises the step of determining (i) the fingerprint of the content item to be introduced in the network and (ii) the identifier of said content introducer.

4. The method according to claim 1, wherein the step of providing a fingerprint comprises the step of (i) receiving the fingerprint of the content item to be introduced in the network and (ii) the identifier of said content introducer.

5. The method according to claim 4, wherein the received fingerprint of the content item and the identifier of said content introducer are determined at a compliant device via which the content introducer introduces said content item in the network.

6. The method according to claim 4, further comprising the step of distributing the signed content identifier certificate to a compliant device via which the content introducer introduces said content item.

7. The method according to claim 6, further comprising the step of distributing a cryptographically protected copy of the random number to the compliant device via which the content introducer introduces said content item.

8. The method according to claim 1, further comprising the steps of:
   generating a watermark identifier and a watermarking key; and
   inserting the watermark identifier in the content item by means of the watermarking key.

9. The method according to claim 8, further comprising the step of:
   distributing the watermark identifier and the watermarking key to a compliant device via which the content introducer introduces said content item, wherein the step of inserting the watermark identifier in the content item by means of the watermarking key is performed at the compliant device.

10. The method according to claim 8, further comprising the step of storing a data post comprising (i) the watermark identifier, (ii) the identifier of said content introducer, (iii) the fingerprint of the content item and (iv) the random number.

11. The method according to claim 10, wherein the data post further comprises the unique content identifier for the content item.

12. The method according to claim 1, wherein the identifier of the content introducer comprises a public key of said content introducer.

13. The method according to claim 1, further comprising the steps of:
   providing identifiers of users which are to be registered as owners of the content item;
   generating a pseudonym for each of said users;
   including, in the content identifier certificate, before signing it, the pseudonyms of said users; and
   distributing the signed content identifier certificate, which includes the pseudonyms of said users, to a compliant device of the respective user.

14. The method according to claim 13, further comprising the step of generating a random number for each of said users and computing the pseudonym for each of said users based on (i) the generated random number and (ii) the identifier of the respective user.

15. The method according to claim 14, further comprising the step of including, in said data post, the identifiers of the users which are to be registered as owners of the content item, and the random number of each of said users.

16. The method according to claim 13, wherein the step of distributing the signed content identifier certificate includes the step of distributing a cryptographically protected copy of each random number to the compliant device of the user for which the random number was generated.

17. A device for preventing unauthorized introduction of content items in a network containing compliant devices and enabling users in the network to be anonymous, said device comprising:
   means for receiving (i) a fingerprint of a content item to be introduced in the network and (ii) an identifier of a content introducer introducing said content item in the network;
   means for comparing said fingerprint to a predetermined set of fingerprints stored in a database of a certificate authority, wherein introduction of the content item is allowed if said fingerprint cannot be found in said set of fingerprints;
   means for generating a pseudonym for the content introducer, wherein the pseudonym provides anonymity for the content introducer in the network; and means for generating a signed content identifier certificate that comprises at least said (i) fingerprint, (ii) a unique content identifier for the content item and (iii) the pseudonym of the content introducer.

18. The device according to claim 17, further comprising means for receiving the identifier of the content introducer by means of reading a smart card inserted into the device, which smart card contains the identifier of the content introducer.

19. The device according to claim 17, further comprising means for selecting a unique content identifier for the content item to be introduced in the network.

20. A system for preventing unauthorized introduction of content items in a network containing compliant devices and enabling users in the network to be anonymous, said system comprising:
- at least one compliant device; and
- a certificate authority, wherein the compliant device is arranged with
- means for determining (i) a fingerprint of a content item to be introduced in the network and (ii) an identifier of a content introducer introducing said content item in the network; and
- means for sending (i) the fingerprint and (ii) the identifier to the certificate authority; and
- the certificate authority is arranged with
- means for comparing said fingerprint to a predetermined set of fingerprints stored in a database of the certificate authority, wherein introduction of the content item is allowed if said fingerprint cannot be found in said set of fingerprints;
- means for generating a pseudonym for the content introducer, wherein the pseudonym provides anonymity for the content introducer in the network;
- means for generating a signed content identifier certificate that comprises at least (i) said fingerprint, (ii) a unique content identifier for the content item and (iii) the pseudonym of the content introducer; and
- means for distributing the signed content identifier certificate to the compliant device.

21. The system according to claim 20, wherein the certificate authority further is arranged with means for revealing, to anyone who can prove knowledge of a private key which corresponds to the respective pseudonym generated for the content introducer or the users which are to be registered as owners of the content item, the random number associated with said respective pseudonym.

22. A certificate used for preventing unauthorized introduction of content items in a network containing compliant devices and enabling users in the network to be anonymous, said certificate comprising at least a (i) fingerprint of a content item to be introduced in the network, (ii) a unique content identifier for the content item, (iii) a pseudonym of a content introducer introducing said content item in the network and (iv) a signature of an authorized certificate authority, wherein the fingerprint comprises a fingerprint having been compared to a predetermined set of fingerprints stored in a database of a certificate authority, and wherein introduction of the content item is allowed since said fingerprint could not be found in the set of fingerprints, and wherein the pseudonym provides anonymity for the content introducer in the network.

* * * * *